(12) United States Patent
Aoki et al.

(10) Patent No.: US 7,194,262 B2
(45) Date of Patent: Mar. 20, 2007

(54) WIRELESS COMMUNICATION SYSTEM, WIRELESS BASE STATION, WIRELESS TERMINAL AND METHOD OF WIRELESS COMMUNICATION

(75) Inventors: Tsuguhide Aoki, Tokyo (JP); Tomoko Adachi, Tokyo (JP); Kiyoshi Toshimitsu, Tokyo (JP); Syuichi Sekine, Tokyo (JP); Mutsumu Serizawa, Tokyo (JP); Hiroki Shoki, Tokyo (JP); Hiroshi Tsurumi, Tokyo (JP); Shuichi Obayashi, Fort Lee, NJ (US); Ren Sakata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 624 days.

(21) Appl. No.: 10/440,114

(22) Filed: May 19, 2003

(65) Prior Publication Data

US 2003/0236082 A1 Dec. 25, 2003

(30) Foreign Application Priority Data

May 17, 2002 (JP) .............................. 2002-143507

(51) Int. Cl.
*H04Q 7/00* (2006.01)

(52) U.S. Cl. .................. 455/428; 455/67.11; 455/517; 455/524

(58) Field of Classification Search ............. 455/278.1, 455/67.11, 456, 414, 416, 445, 503, 518, 455/522; 370/449, 346, 335
See application file for complete search history.

(56) References Cited

U.S. PATENT DOCUMENTS

| | | | | |
|---|---|---|---|---|
| 5,617,412 A | * | 4/1997 | Delprat et al. ............... | 370/281 |
| 6,275,500 B1 | * | 8/2001 | Callaway et al. ........... | 370/449 |
| 6,360,076 B1 | * | 3/2002 | Segura et al. ............ | 455/67.11 |
| 6,804,528 B1 | * | 10/2004 | Laroia et al. ............... | 455/503 |
| 2002/0009990 A1 | * | 1/2002 | Kleier et al. ................ | 455/416 |
| 2002/0098860 A1 | * | 7/2002 | Pecen et al. ................ | 455/522 |
| 2003/0036388 A1 | * | 2/2003 | Rosen ........................ | 455/445 |
| 2003/0096621 A1 | * | 5/2003 | Jana et al. .................. | 455/456 |

FOREIGN PATENT DOCUMENTS

| | | |
|---|---|---|
| JP | 2001-189954 | 7/2001 |
| JP | 2001-352288 | 12/2001 |
| JP | 2002-132613 | 5/2002 |

OTHER PUBLICATIONS

U.S. Appl. No. 10/423,946, filed Apr. 28, 2003, Matsuo et al.
U.S. Appl. No. 10/422,699, filed Apr. 25, 2003, Sekine et al.

(Continued)

*Primary Examiner*—Matthew D. Anderson
*Assistant Examiner*—Tan Trinh
(74) *Attorney, Agent, or Firm*—Oblon, Spivak, McClelland, Maier & Neustadt, P.C.

(57) ABSTRACT

An object of the present invention is to provide a wireless communication system, a wireless communication system, comprising: one or more wireless base station; and a plurality of wireless terminals capable of communicating with said wireless base station by wireless, two or more of said wireless terminals capable of communicating with each other by wireless thereby forming a wireless terminal group; wherein said wireless base station has a representative determination unit configured to determine at least one wireless terminal belonging to said wireless terminal group as a representative terminal; and said representative terminal receives first frames transmitted from other wireless terminals belonging to said wireless terminal group, and transmits the received first frames to said wireless base station.

16 Claims, 9 Drawing Sheets

OTHER PUBLICATIONS

U.S. Appl. No. 10/440,114, May 19, 2003, Aoki et al.
U.S. Appl. No. 10/440,115, May 19, 2003, Sakata et al.
U.S. Appl. No. 10/440,114, filed May 19, 2003, Aoki et al.
U.S. Appl. No. 10/751,497, filed Jan. 6, 2004, Sekine et al.

* cited by examiner

| WIRELESS STATION NAME | IDENTIFIER NUMBER |
|---|---|
| WIRELESS BASE STATION 10 | 0 |
| WIRELESS TERMINAL 201 | 1 |
| WIRELESS TERMINAL 202 | 2 |
| WIRELESS TERMINAL 203 | 3 |
| WIRELESS TERMINAL 204 | 4 |
| WIRELESS TERMINAL 205 | 5 |
| WIRELESS TERMINAL 301 | 6 |
| WIRELESS TERMINAL 302 | 7 |

| WIRELESS TERMINAL IDENTIFIER | WIRELESS GROUP IDENTIFICATION NUMBER |
|---|---|
| 1 | 1 |
| 2 | 1 |
| 3 | 1 |
| 4 | 1 |
| 5 | 1 |
| 6 | 2 |
| 7 | 2 |
| 8 | 2 |

FIG. 5

| WIRELESS STATION IDENTIFIER NUMBER | RECEIVED STATUS OF WIRELESS STATION |
|---|---|
| 1 | RECEIVED STATUS FROM WIRELESS BASE STATION 0 TO WIRELESS TERMINAL 1 |
| 2 | RECEIVED STATUS FROM WIRELESS BASE STATION 0 TO WIRELESS TERMINAL 2 |
| 3 | RECEIVED STATUS FROM WIRELESS BASE STATION 0 TO WIRELESS TERMINAL 3 |
| 4 | RECEIVED STATUS FROM WIRELESS BASE STATION 0 TO WIRELESS TERMINAL 4 |
| 5 | RECEIVED STATUS FROM WIRELESS BASE STATION 0 TO WIRELESS TERMINAL 5 |
| 6 | RECEIVED STATUS FROM WIRELESS BASE STATION 0 TO WIRELESS TERMINAL 6 |
| 7 | RECEIVED STATUS FROM WIRELESS BASE STATION 0 TO WIRELESS TERMINAL 7 |
| 8 | RECEIVED STATUS FROM WIRELESS BASE STATION 0 TO WIRELESS TERMINAL 8 |

FIG. 6

| WIRELESS STATION IDENTIFIER NUMBER | WIRELESS GROUP IDENTIFICATION NUMBER | REPRESENTATIVE TERMINAL IDENTIFIER |
|---|---|---|
| 1 | 1 | 1 |
| 2 | 1 | 0 |
| 3 | 1 | 0 |
| 4 | 1 | 0 |
| 5 | 1 | 0 |
| 6 | 2 | 1 |
| 7 | 2 | 0 |
| 8 | 2 | 0 |

FIG. 7

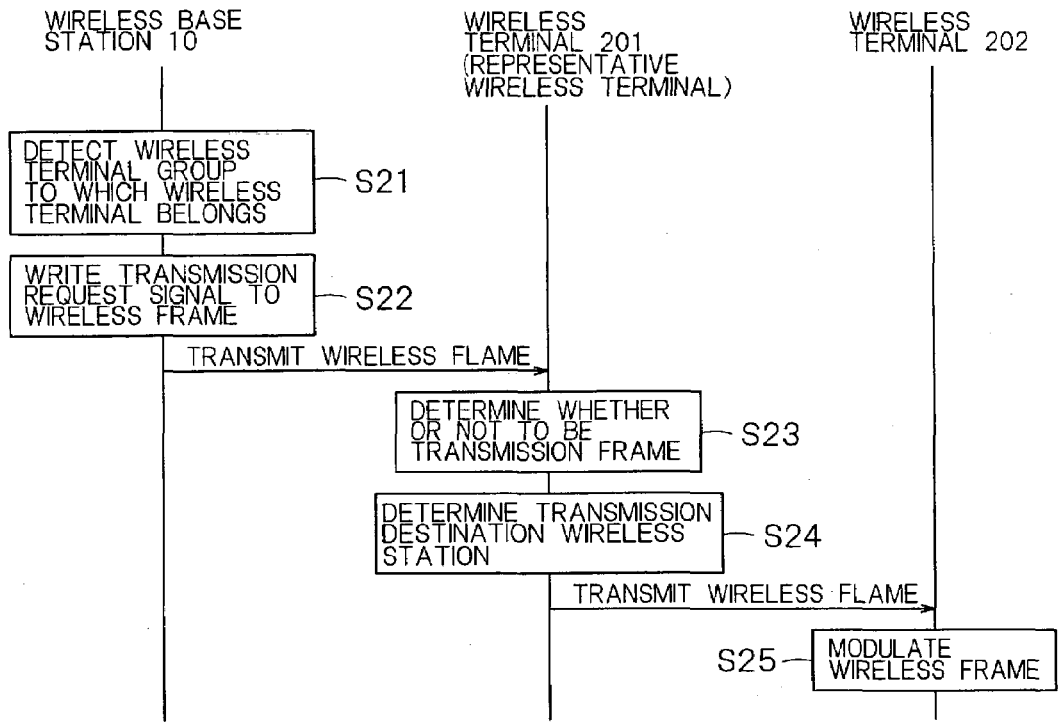

FIG. 13

| WIRELESS TERMINAL IDENTIFIER | WIRELESS TERMINAL GROUP IDENTIFIER | WIRELESS TERMINAL CAPABILITY |
|---|---|---|
| WIRELESS TERMINAL IDENTIFIER 1 | WIRELESS TERMINAL GROUP IDENTIFIER 1 | WIRELESS TERMINAL CAPABILITY 1 |
| WIRELESS TERMINAL IDENTIFIER 2 | WIRELESS TERMINAL GROUP IDENTIFIER 2 | WIRELESS TERMINAL CAPABILITY 2 |
| WIRELESS TERMINAL IDENTIFIER 3 | WIRELESS TERMINAL GROUP IDENTIFIER 3 | WIRELESS TERMINAL CAPABILITY 3 |
| WIRELESS TERMINAL IDENTIFIER 4 | WIRELESS TERMINAL GROUP IDENTIFIER 4 | WIRELESS TERMINAL CAPABILITY 4 |
| WIRELESS TERMINAL IDENTIFIER 5 | WIRELESS TERMINAL GROUP IDENTIFIER 5 | WIRELESS TERMINAL CAPABILITY 5 |
| WIRELESS TERMINAL IDENTIFIER 6 | WIRELESS TERMINAL GROUP IDENTIFIER 6 | WIRELESS TERMINAL CAPABILITY 6 |
| WIRELESS TERMINAL IDENTIFIER 7 | WIRELESS TERMINAL GROUP IDENTIFIER 7 | WIRELESS TERMINAL CAPABILITY 7 |

FIG. 14

| MODULATION SYSTEM | DESIRABLE RECEIVED STATUS | TRANSMISSION CAPACITY |
|---|---|---|
| QPSK | DESIRABLE RECEIVED STATUS 1 | TRANSMISSION CAPACITY 1 |
| 8PSK | DESIRABLE RECEIVED STATUS 2 | TRANSMISSION CAPACITY 2 |
| 16PSK | DESIRABLE RECEIVED STATUS 3 | TRANSMISSION CAPACITY 3 |
| . | | |
| 16QAM | DESIRABLE RECEIVED STATUS N−2 | TRANSMISSION CAPACITY N−2 |
| 32QAM | DESIRABLE RECEIVED STATUS N−1 | TRANSMISSION CAPACITY N−1 |
| 64QAM | DESIRABLE RECEIVED STATUS N | TRANSMISSION CAPACITY N |

FIG. 15

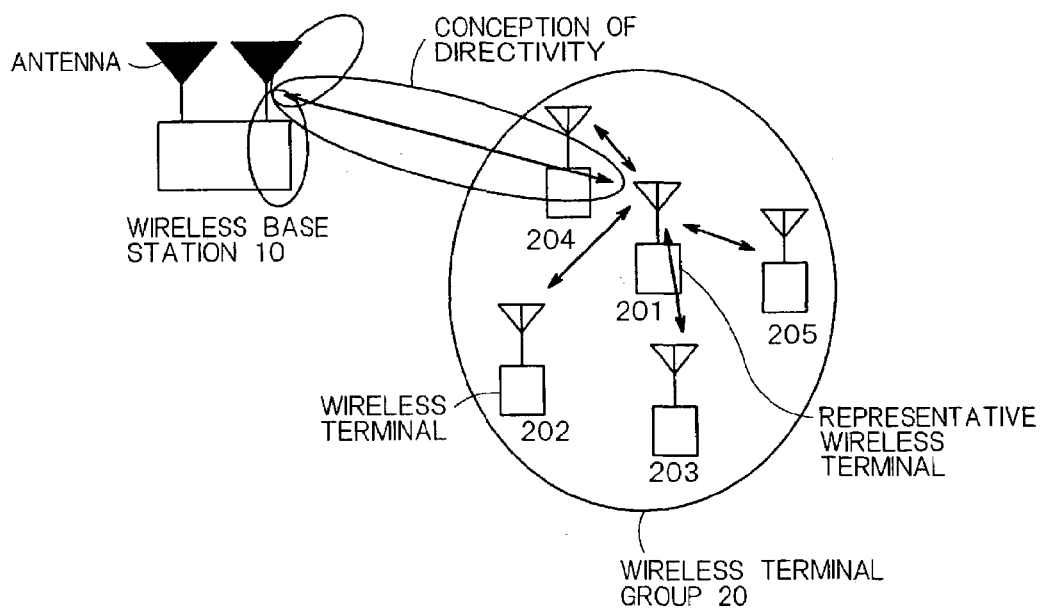

FIG. 16

| ERROR RATE CONTROL SYSTEM | TRANSMISSION CAPACITY | ERROR CORRECTION/ DETECTION CAPABILITY |
|---|---|---|
| ERROR CORRECTION CODE 1 | TRANSMISSION CAPACITY 1 | ERROR CORRECTION 1 |
| ERROR CORRECTION CODE 2 | TRANSMISSION CAPACITY 2 | ERROR CORRECTION 2 |
| ERROR CORRECTION CODE 3 | TRANSMISSION CAPACITY 3 | ERROR CORRECTION 3 |
| . | | |
| ERROR DETECTION CODE 1 | TRANSMISSION CAPACITY N-2 | ERROR DETECTION CAPABILITY 1 |
| ERROR DETECTION CODE 2 | TRANSMISSION CAPACITY N-1 | ERROR DETECTION CAPABILITY 2 |
| ERROR DETECTION CODE 3 | TRANSMISSION CAPACITY N | ERROR DETECTION CAPABILITY 3 |

FIG. 17

| WIRELESS TERMINAL IDENTIFIER | WIRELESS TERMINAL STATUS |
|---|---|
| 1 | WIRELESS TERMINAL STATUS 1 |
| 2 | WIRELESS TERMINAL STATUS 2 |
| 3 | WIRELESS TERMINAL STATUS 3 |
| 4 | WIRELESS TERMINAL STATUS 4 |

FIG. 18

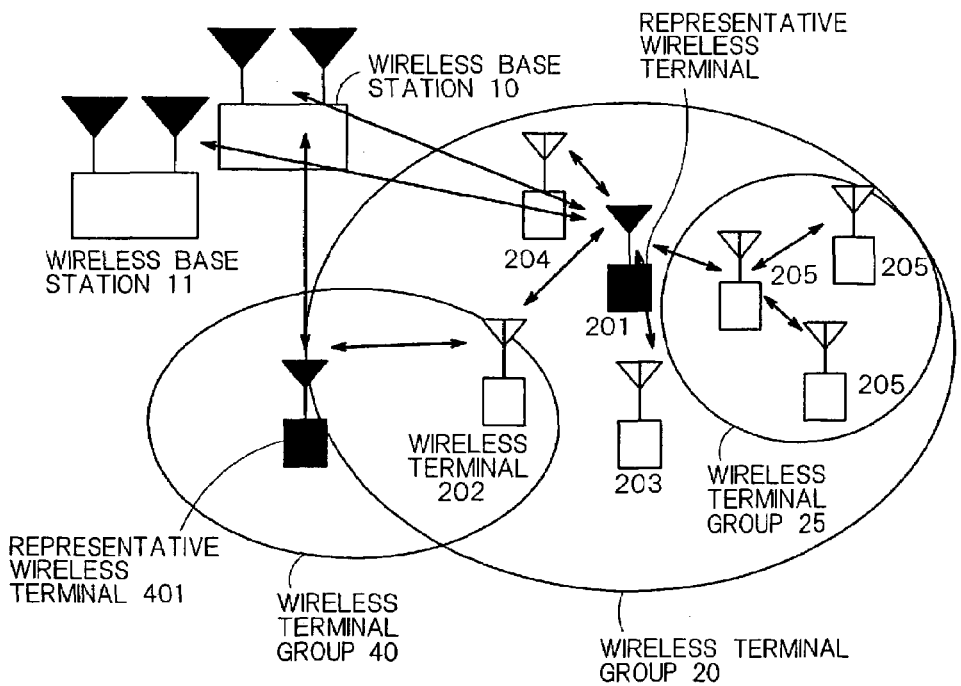

FIG. 19

WIRELESS COMMUNICATION SYSTEM, WIRELESS BASE STATION, WIRELESS TERMINAL AND METHOD OF WIRELESS COMMUNICATION

CROSS REFERENCE TO RELATED APPLICATIONS

This application claims benefit of priority under 35USC§119 to Japanese Patent Application No. 2002-143507, filed on May 17, 2002, the entire contents of which are incorporated by reference herein.

BACKGROUND OF THE INVENTION

1. Field of the Invention

The present invention relates to a wireless communication system, a wireless base station, a wireless terminal and a method of wireless communication which perform wireless communication between the wireless base station and a plurality of wireless terminals.

2. Related Art

There are the following three frame formats in a wireless communication system composed of a wireless base station and wireless terminals.

1) A unicast format in which the wireless base station discriminates the wireless terminals, and transmits individual wireless frames to the wireless terminals.

2) A multicast format in which although the individual wireless terminals are discriminated, the wireless frames are collectively transmitted to all the wireless terminals.

3) A broadcast format in which the wireless frames are transmitted without discriminating the wireless terminals In the unicast format, it is possible to perform transmission suitable for the wireless terminals depending on propagation paths for the wireless terminals, and to assure received qualities of the wireless terminals. However, since a traffic increases in proportion to the number of the wireless terminals, there is a drawback in which frequency availability deteriorates.

On the other hand, in the multicast format and the broadcast format, since the wireless frames are transferred in block to a plurality of wireless terminals, it is possible to improve the frequency availability. However, in order to assure the received qualities of the wireless terminals, the wireless frames have to be transmitted in accordance with the wireless terminal having poor received properties, thereby deteriorating power efficiency. Furthermore, it is difficult to apply retransmitting control techniques for transmitting the wireless frames to all the wireless terminals, and the wireless frames has to be repeatedly retransmitted so that all the wireless terminals can correctly receive the wireless frames. Because of this, control efficiency of the wireless base station deteriorates due to retransmission.

Japanese patent Laid-Open No. 2002-132613 discloses techniques in which a representative user terminal is selected from a plurality of user terminals, and the representative user terminal communicates with a distribution server. More specifically, the distribution server divides download data according to information from the representative user terminal, transmits the divided data to the user terminals, and combines the divided data received by the user terminals.

In the techniques disclosed in this document, a plurality of user terminals cooperatively download data. Because of this, if some user terminals cannot correctly download data, it becomes impossible to combine data and to download reliable data.

SUMMARY OF THE INVENTION

An object of the present invention is to provide a wireless communication system, a wireless base station, a wireless terminal and a method of wireless communication which excel in a transmission efficiency and a power efficiency.

In order to achieve the foregoing object, a wireless communication system, comprising:

one or more wireless base station; and a plurality of wireless terminals capable of communicating with said wireless base station by wireless, two or more of said wireless terminals capable of communicating with each other by wireless thereby forming a wireless terminal group;

wherein said wireless base station has a representative determination unit configured to determine at least one wireless terminal belonging to said wireless terminal group as a representative terminal; and said representative terminal receives first frames transmitted from other wireless terminals belonging to said wireless terminal group, and transmits the received first frames to said wireless base station.

BRIEF DESCRIPTION OF THE DRAWINGS

FIG. 5 is a diagram showing a management table for managing a wireless terminal group.

FIG. 6 is a diagram showing a management table for managing received status of the wireless terminal.

FIG. 7 is a diagram showing a management table extending the management table of FIG. 5.

FIG. 13 is a diagram showing one example of transmission sequence of a wireless frames.

FIG. 14 is a diagram showing one example of a management table which manages performance of the wireless terminals belonging to the wireless terminal group.

FIG. 15 is a diagram showing one example of a management table in the case of determining the modulation scheme.

FIG. 16 is a diagram showing transmission using directivity of the antennas.

FIG. 17 is a diagram showing one example of a reference table in the case of determining an error control system.

FIG. 18 is a diagram showing a management table for managing operation status of the wireless terminal.

FIG. 19 is a diagram showing hierarchization of the wireless terminal group.

DESCRIPTION OF THE PREFERRED EMBODIMENTS

Hereinafter, a wireless communication system according to the present invention will be more specifically disclosed with reference to drawings.

(First Embodiment)

Figure 1:
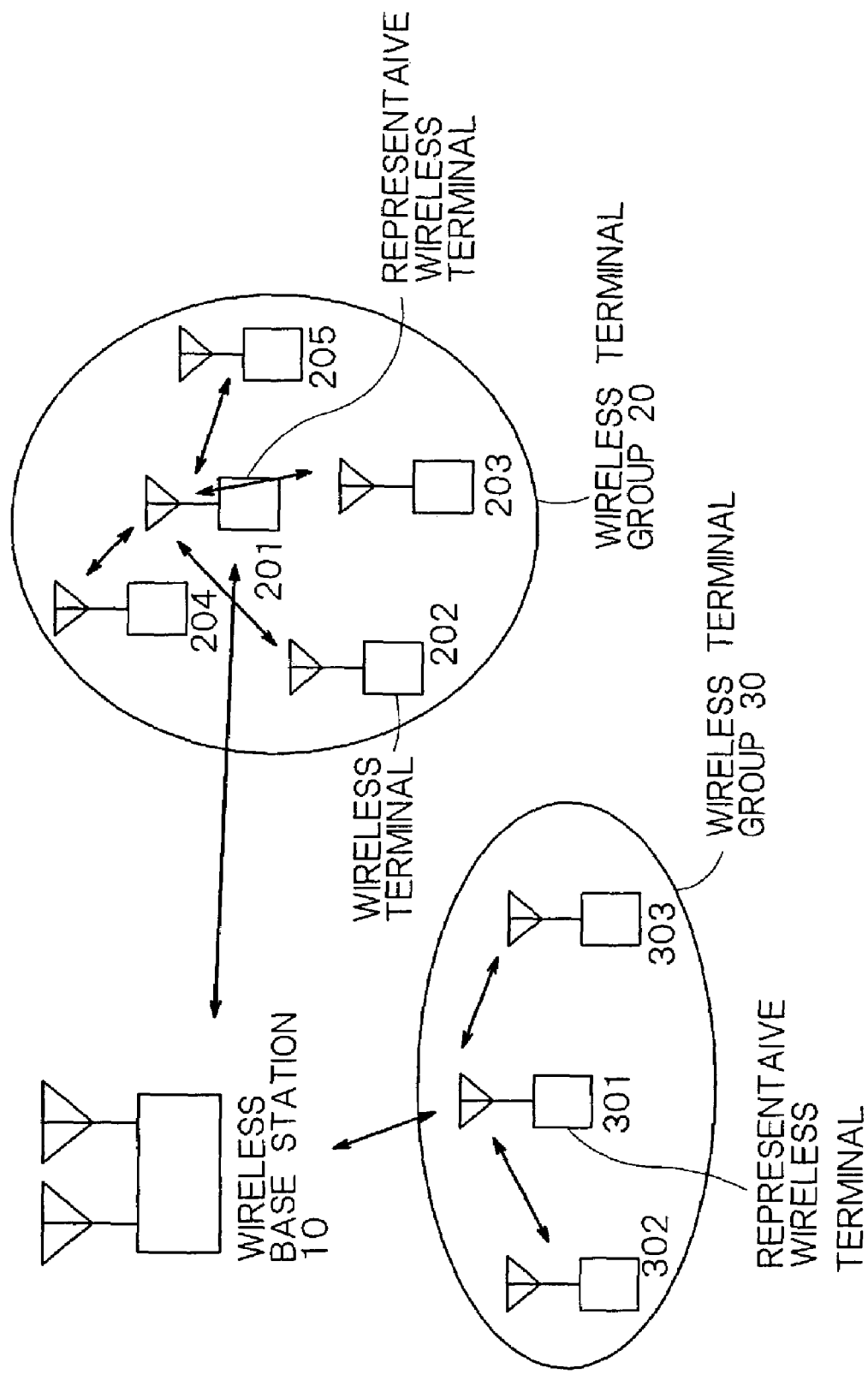
FIG. 1 is a block diagram showing schematic configuration of a first embodiment of a wireless communication system according to the present invention.

FIG. 1 is a block diagram showing schematic configuration of a first embodiment of a wireless communication system according to the present invention. The wireless communication system of FIG. 1 has a wireless base station 10 provided in a communication service area and wireless terminal groups 20 and 30 composed of a plurality of wireless terminals which communicate with the wireless base station 10 via a wireless channel. FIG. 1 shows an example in which two wireless terminal groups 20 and 30 are provided. The number of the wireless terminal groups is not limited. The method of forming the wireless terminal groups is described below.

At least one representative wireless terminal 201 is provided in the wireless terminal group 20. A method of determining the representative wireless terminal 201 will be also described below.

The wireless base station 10 and the wireless terminals has individual numbers (hereinafter, called an identification number) to identify them. For example, the wireless base station 10 has a identification number 0, the representative wireless terminal 201 has a identification number 1, and the wireless terminal 202 has a identification number 2.

The wireless base station 10 and the wireless terminals communicate through the wireless channel. A format of the wireless frame communicated between the wireless base station 10 and the wireless terminals is shown in, for example, FIG. 3.

Figures 2, 3:
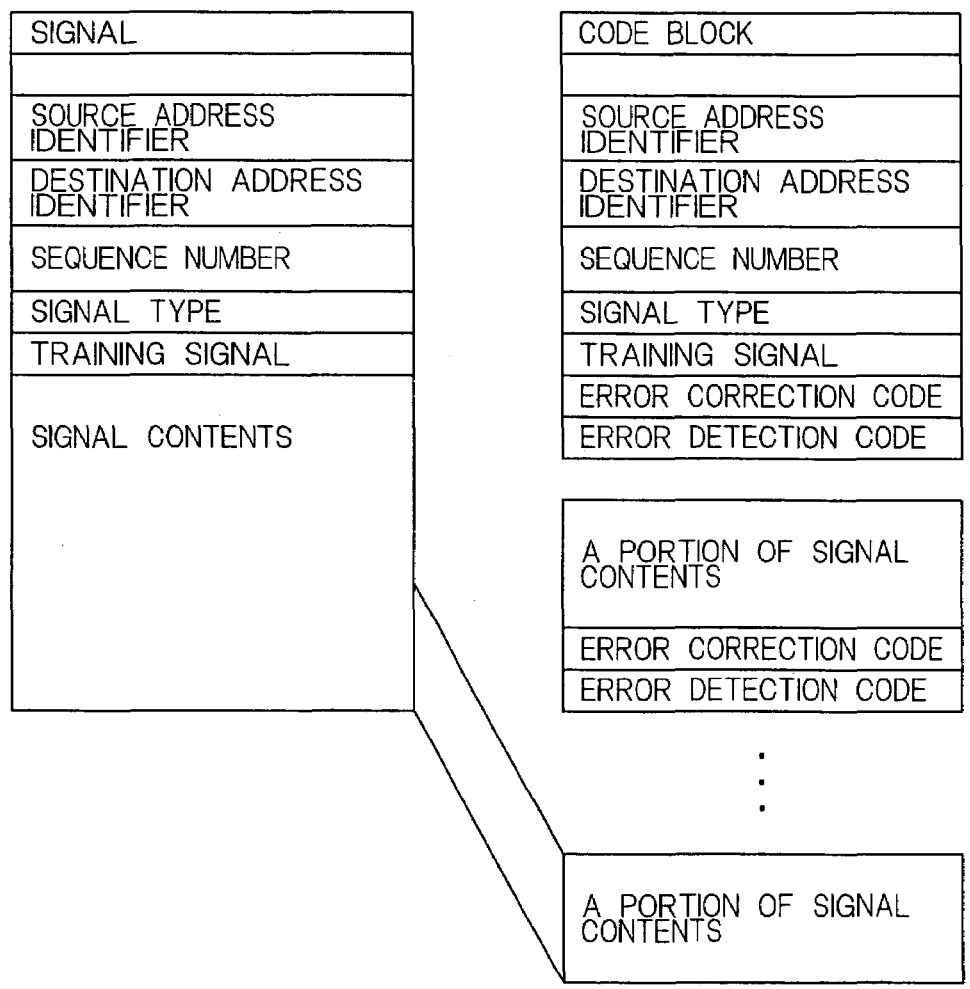
FIG. 2 is a diagram showing identifier numbers for identifying a wireless base station and wireless terminal.
FIG. 3 is a diagram showing a format of a wireless frame.

The wireless frame of FIG. 3 has a signal composed of a symbol block, an address identifier, a destination address identifier, a sequence number, a signal type, a training signal, and signal contents. The signal contents are disposed portion by portion by sandwiching an error correction code and an error detection code.

The source address identifier and the destination address identifier are used to identify the transmission destination and the wireless station of the wireless frames. The destination address identifier includes not only an individual identifier of the wireless stations (called as unicast address), but also an identifier for transmitting signals to the wireless terminal group 20 (called as multicast address), and an identifier for transmitting signals to all the wireless terminals (called bas broadcast address).

The sequence number is used to discriminate the wireless frame including the same wireless station number. The signal type is used to identify the kinds of the signals such as a control signal used for control between the wireless stations and the kinds of data signal such as sound and image. The signal contents express contents of information to be communicated, and are different from the kinds of signals. The error correction code is used to correct errors of the signal at received side of the signal. The error detection code is used to detect errors at received side.

Figure 4:
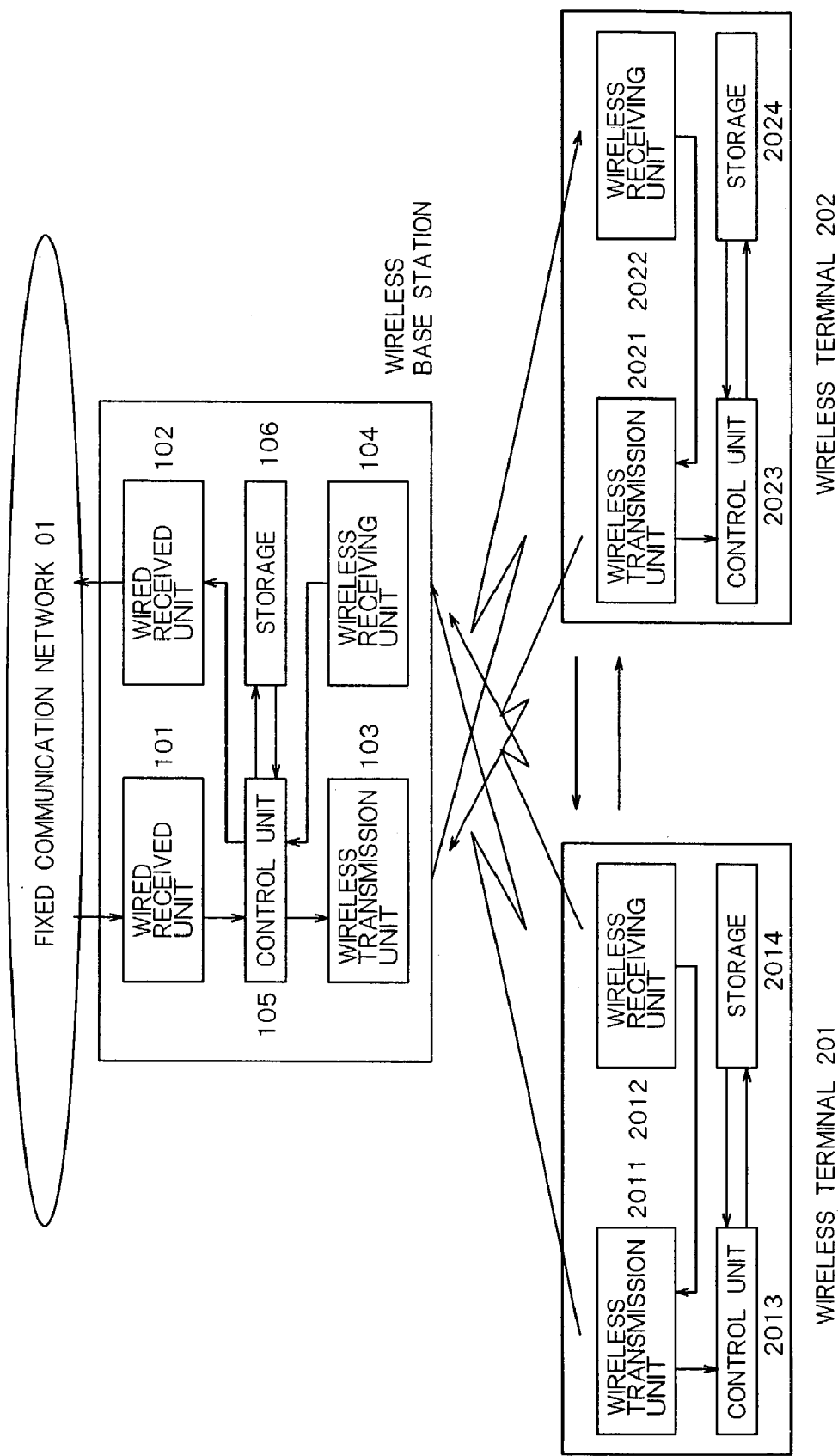
FIG. 4 is a block diagram showing one example of internal configurations of the wireless base station and the wireless terminals of the present invention.

FIG. 4 is a block diagram showing an example of internal configurations of the wireless base station 10 and the wireless terminals 201 and 202 according to the present embodiment. The wireless base station 10 of FIG. 4 has a wired receiving unit 101, a wired transmission unit 102, a wireless transmission unit 103, a wireless receiving unit 104, a control unit 105 and a storage 106.

The wireless transmission unit 103 and the wireless receiving unit 104 communicate the wireless frames with the wireless terminals. The wired receiving unit 101 is connected to a fixed communication network 101, and receives the wireless frames from the other base station and so on. The wireless transmission unit 103 transmits the wireless frames to the other base station and so on. The control unit 105 performs various processings for various signals to be transmitted based on the processings for the wireless frames received by the wired receiving unit 101 and the wireless frames to be transmitted from the wired transmission unit 102, various signals from the wireless terminals received by the wireless receiving unit 103, and data stored in the storage 106.

The representative wireless terminal 201 has a wireless transmission unit 2011 which transmits the wireless frames, a wireless received unit 2012 which receives the wireless frames, a control unit 2013 which controls the wireless transmission unit 2011 and the wireless received unit 2012, and a storage 2014 which stores the wireless frames and control information. The wireless terminal 202 also has a wireless transmission unit 2021, a wireless received unit 2022, a control unit 2023 and a storage 2024, similarly to the representative wireless terminal 201.

In the present embodiment, the same frequency is used for a downlink from the wireless base station 10 to the wireless terminals and an uplink from the wireless terminals to the wireless base station. It is assumed that the wireless receiving unit 2012 can receive the wireless frames transmitted by the other wireless terminals.

The storage 106 in the wireless base station 10 has a management table such as FIG. 5 for managing the wireless terminal group 20, and a management table such as FIG. 6 for managing a received status of the wireless terminals. The management tables are composed of records consisted of a plurality of fields, and the number of the records is variable.

The management table of FIG. 5 records a relationship between the identification numbers of the wireless terminals and the identification numbers of the wireless terminal groups to which the wireless terminals belong.

The management table of FIG. 6 records the identification number of the wireless terminals and the received status of the wireless terminals.

The management table of FIG. 5 may be extended a management table shown in FIG. 7. The management table of FIG. 7 records a wireless station identification number for identifying the wireless terminals, a wireless group identification number for identifying the wireless terminal groups, and a representative terminal identification number for identifying the representative wireless terminal.

Figures 8, 9, 10:
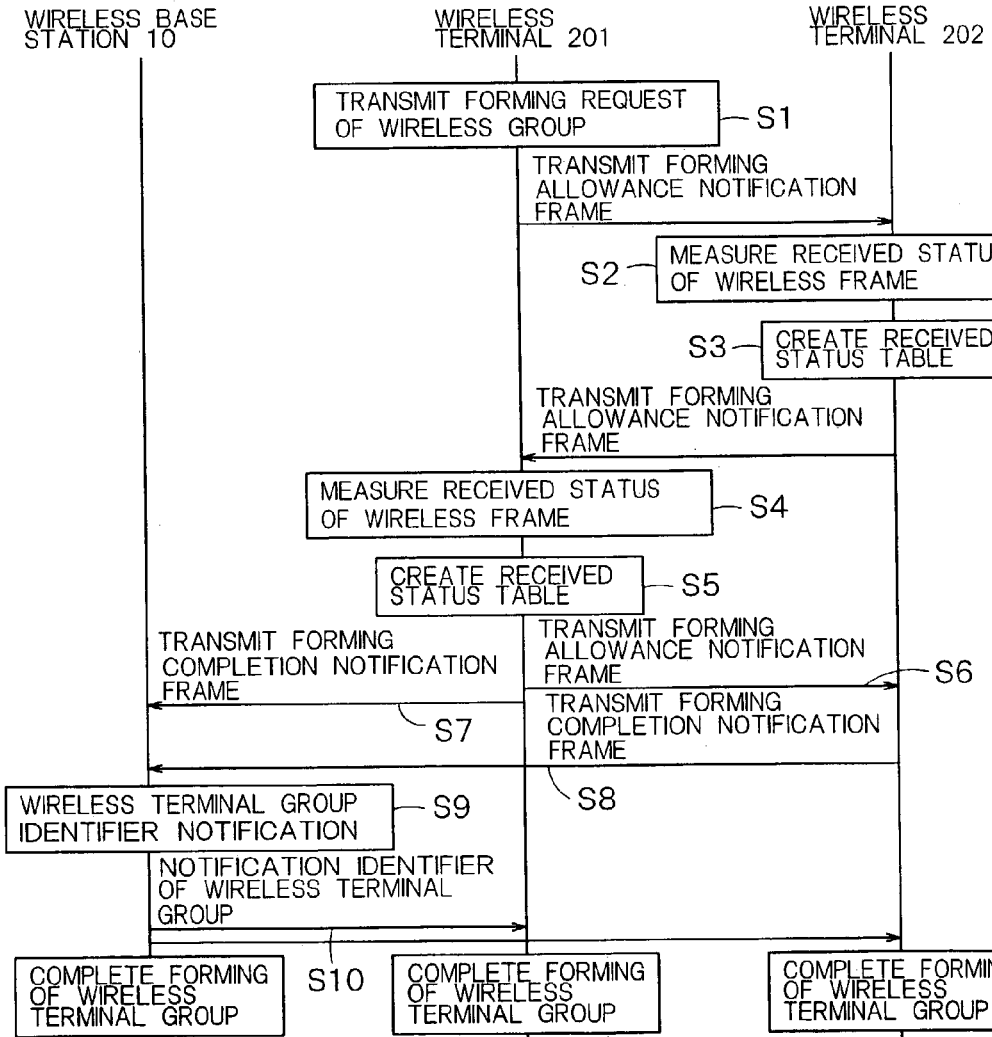
FIG. 8 is a diagram showing a management table for recording recorded status from a peripheral wireless terminal.
FIG. 9 is a diagram showing a management table for detecting the wireless terminal group to which its own terminal belongs.
FIG. 10 is a diagram showing control sequence showing a method of forming the wireless terminal group of the first embodiment.

The storages 2014 and 2024 of the wireless terminals 201 and 202 stores a management table of FIG. 8 for recording a received status from peripheral wireless terminals in order to form the wireless terminal 20, and a management table of FIG. 9 for detecting whether or not its own terminal is the representative wireless terminal and the wireless terminal groups to which its own terminal belongs, after the wireless terminal group 20 is formed.

Next, assuming the case of FIG. 1, a method of forming the wireless terminal group 20 of the first embodiment will be described hereinafter. FIG. 10 is a diagram showing one example of a control sequence showing a method of forming the wireless terminal group 20 of the first embodiment. As a sign for starting the forming of the wireless terminal group 20, for example, an operator may instruct the start of the processings of FIG. 1 by hand, or the wireless terminals or the wireless base station may instruct the start of the processings of FIG. 1.

Here, it is assumed that the wireless terminal 201 requests the forming of the wireless terminal group 20 for the wireless terminal 202. The wireless terminal 201 writes the identifier indicating the forming request of the wireless terminal group 20 in a block of the signal type in the wireless frame, its own identifier in the source address identifier in the wireless frame, and the identifier of the wireless terminal 202 in the destination address identifier in the wireless frame (step S1). After then, the wireless frame is transmitted from the wireless transmission unit 2011.

The wireless receiving unit 2022 of the wireless terminal 202 receives the wireless frame, and confirms the destination address identifier in order to determine whether or not the wireless frame is its own wireless frame by confirming the destination address identifier. When the identifier is for itself, and the signal type is the forming request of the wireless terminal group 20, the wireless receiving unit confirms the transmitting wireless station identification number, and begins measurement of the received status of the wireless frames (step S2).

The received status of the wireless frames is stored in the storage 2024, and the management table for detecting the received status from the wireless terminals shown in FIG. 8 is created (step S3). The management table is necessary for forming the wireless terminal group 20.

The control unit 2023 of the wireless terminal 202 refers FIG. 8. When the received status from the wireless terminal which performs the forming request of the wireless terminal group 20 is equal to or more than a certain threshold value, and the wireless terminal 202 wants the forming of the wireless terminal group 20, the control unit 2023 resisters the identifier indicating to be able to form the wireless terminal group 20 to the signal type of FIG. 3, its own identifier to the source address identifier, and the wireless station identifier of the representative wireless terminal 201 to the source address identifier, respectively. And then the wireless frame is transmitted from the wireless transmission unit 2021.

The representative wireless terminal 201 demodulates the wireless frames. If the wireless frame indicates to be able to form the wireless terminal group 20, measurement of the received status of the wireless frame is started (step S4).

The representative wireless terminal 201 also creates the management table in the same way as FIG. 8, which detects the received status from the wireless terminals (step S5). If the received status from the representative wireless terminal 201 is no less than a certain threshold value, the identifier of the wireless terminal 202 is registered to the destination address identifier of the wireless frame, and its own identifier is registered to the transmitting wireless station identifier of the wireless frames. And then the wireless frame notifying the forming of the wireless terminal group 20 is transmitted from the wireless transmission unit 2011 (step S6).

Subsequently, the identifier of the wireless base station 10 is registered to the destination address identifier of the wireless frames, and the identifiers of the wireless terminals belonging to the wireless terminal group 20 are registered to the signal contents of the wireless frames. And then the wireless frame notifying the forming completion of the wireless terminal group 20 is transmitted from the wireless transmission unit 2011 (step S7).

The wireless terminal 202 confirms the reception of the wireless frames for indicating that the representative wireless terminal 201 can form the wireless terminal group 20, and then transmits the wireless frame which notifies the wireless base station 10 of what the forming of the wireless terminal group 20 has been finished (step S8).

The wireless receiving unit 104 of the wireless base station 10 demodulates the wireless frames, and confirms the frames which the representative wireless terminal 201 and the wireless terminal 202 notify that the forming of the wireless terminal group 20 has been finished. And then the control unit 105 creates the management table which manages the wireless terminal group 20, for example, shown in FIG. 7, in the storage 106 (step S9). The identifier of the wireless terminal group 20 is added to the table.

Finally, the wireless base station 10 registers the identifier of the representative wireless terminal 201 to the destination address identifier of the wireless frames, and registers the identifier of the wireless base station 10 to the source address identifier. And then the identifier of the wireless terminal group 20 is notified by using the wireless frame (step S10).

Similarly, the identifier of the wireless terminal group 20 is also notified to the wireless terminal 202. In this case, it may be possible to notify all the wireless terminals located in communication range of the wireless base station 10 of the forming of the wireless terminal group 20 using multicast or broadcast format.

By the above-mentioned processings, the forming of the wireless terminal group 20 is finished. When the number of the wireless terminals constituting the wireless terminal group 20 is no less than three, a control shown in FIG. 10 is performed between all the wireless terminals of the wireless terminal group 20. It is possible to start measurement of the received status between the wireless terminals before receiving the wireless frames for forming the wireless terminal group 20.

The above-mentioned forming of the wireless terminal group 20 is performed for every constant time period. The wireless terminals constituting the wireless terminal group 20 momentarily change according to movement of the wireless terminals and fluctuation of the received status. It is possible to always disband and restructure the wireless terminal group 20 by indication of the wireless base station 10 even before the constant time period passes.

When the wireless terminals belonging to the wireless terminal group 20 withdraws from the wireless terminal group 20, a withdrawal from the wireless terminal group 20 is requested to the representative wireless terminal 201 of the wireless terminal group 20. The representative wireless terminal 201 confirms that transmission of all the wireless frames for the wireless terminal which hopes the withdrawal has been finished. And then the wireless frame for allowing the withdrawal is transmitted from the wireless terminal group 20. After the reception of the wireless frame notifying allowance of the withdrawal is confirmed, the wireless terminal can withdraw from the wireless terminal group 20.

Figures 11, 12:
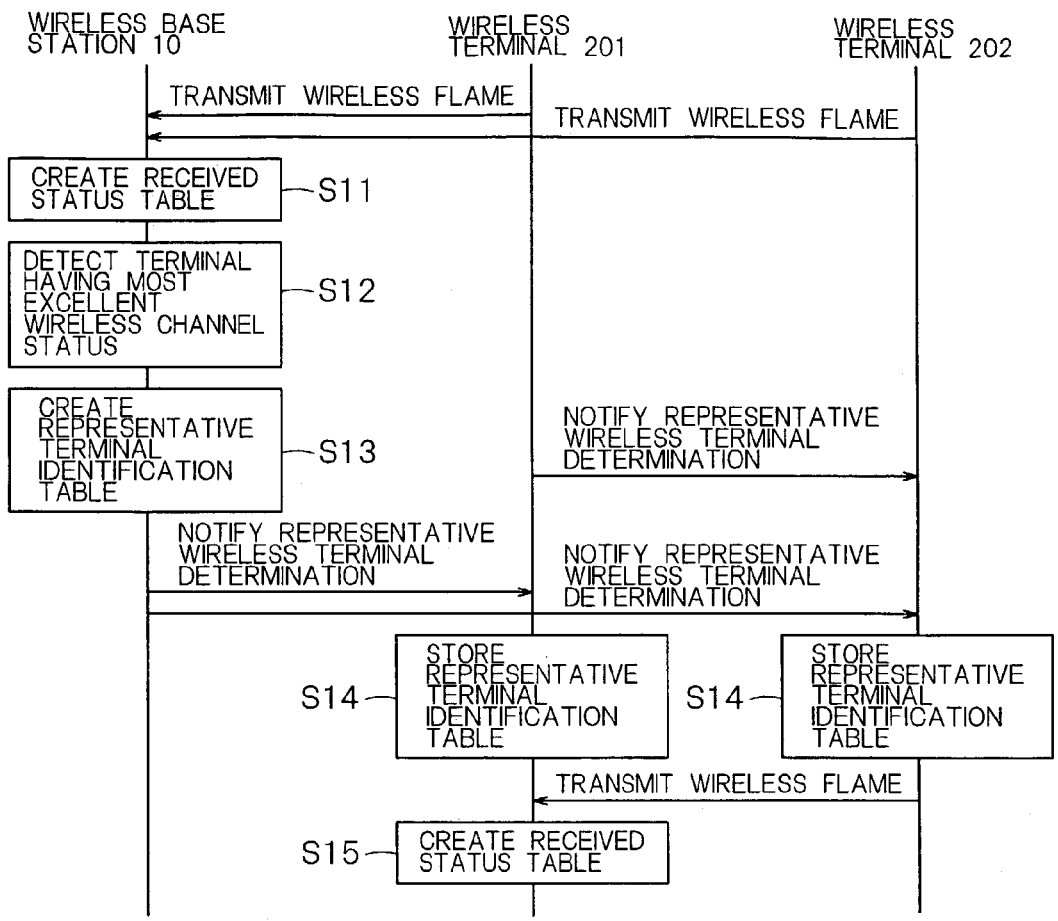
FIG. 11 is a diagram showing one example of control sequence which determines the representative wireless terminal among the wireless terminal group.
FIG. 12 is a diagram showing a field of the representative wireless terminal identifier.

Next, a method of determining the representative wireless terminal 201 will be described. FIG. 11 is a diagram showing one example of a control sequence for selecting the representative wireless terminal 201 from the wireless terminal group 20. The received status from the wireless terminals received by the wireless receiving unit 103 in the wireless base station 10 is stored in the storage 106 via the control unit 105, in order to create the management table (step S11).

After the received status from all the wireless terminals are received, one wireless terminal having the most excellent received status among all the wireless terminals belonging to the wireless terminal group 20 in the management table (step S12) is determined as the representative wireless terminal 201. If assumed that the received status of the wireless terminal 201 is the most excellent, the wireless terminal 201 is registered as the representative wireless terminal.

Next, the management table for identifying the representative wireless terminal as shown in FIG. 7 is created. In the management table, if the wireless station identification number of the representative wireless terminal 201 is "1", and the wireless terminal belongs to the wireless station identification number "1", "1" is registered as the representative terminal identification number corresponding to the wireless station identification number 1, and "0" is registered as the representative terminal identification number corresponding to the other wireless terminal group (step S13).

The identifier of the representative wireless terminal 201 in the wireless terminal group 20 may be described in the field of the representative terminal identifier of the management table of FIG. 7, as shown in FIG. 12.

In such a way, after the wireless base station 10 creates the management table for managing the wireless terminal group 20, the wireless base station 10 notifies the wireless terminal group 20 of determination of the representative wireless terminal 201. This notification is applicable to the unicast format, the multicast format and the broadcast format.

The control unit 105 extracts the wireless terminal which coincides with the identification number of the wireless terminal group 20, and transmits the wireless frame including notification information of the representative wireless terminal to the extracted wireless terminals. For example, when the transmission is performed to the wireless terminal group 20 of the identification number 1, an arrow portion of FIG. 7 is embedded in the wireless frames, and transmitted from the wireless transmission unit 104. This is equal to the management table of FIG. 9.

The wireless terminals belonging to the wireless terminal group 20 demodulates the wireless frames received by the wireless receiving units 2012 or 2022. When the destination address identifier includes its own address (a multicast address or a broadcast address) and the wireless frame is a notification wireless frame deciding the representative wireless terminal, the control units 2013 and 2023 store the management table of FIG. 9 in the storage 9 (step S14). Furthermore, the control units 2013 and 2023 determine whether or not their own terminals are the representative wireless terminals, with reference to the management table shown in FIG. 9.

After the representative wireless terminal 201 is determined, the representative wireless terminal 201 notifies the wireless base station 10 of the received status between the wireless terminals belonging to the wireless terminal group 20. More specifically, the management table of FIG. 8 is transmitted by being contained in the wireless frame.

Similarly to the forming of the wireless terminal group 20, the representative wireless terminal 201 is determined for every a constant time interval, and the representative wireless terminal 201 momentarily changes according to movement of the wireless terminals or fluctuation of the received status. Even before when the constant time interval passes, the wireless base station 10, the representative wireless terminal 201, or the other wireless base station can indicate the withdrawal and re-determination of the representative wireless terminal 201.

The representative wireless terminal 201 can be withdrew after transmission of a certain wireless frame to the wireless terminal of the wireless terminal group 20 is finished. Furthermore, the representative wireless terminal 201 is not limited to only one. A plurality of representative wireless terminals may be provided.

Next, transmission of the wireless frame will be described. The wireless base station 10 holds the wireless frame in which the broadcast address or the multicast address for the wireless terminal group 20 is described.

FIG. 13 is a diagram showing one example of a sequence of wireless frame transmission. The wireless base station 10 does not transmit the wireless frames by the broadcast format or the multicast format, but transmits the wireless frame addressing to the representative wireless terminal 201 using unicast format of the wireless terminal group 20.

More specifically, the wireless base station 10 detects the wireless terminal group to which the wireless terminals belong with reference to FIG. 7 stored in the storage 106 (step S21). The wireless base station 10 acquires the identification number of the representative wireless terminal from the detected wireless terminal group. And then the wireless transmission unit 104 transmits the wireless frame to the representative wireless terminal in the unicast format.

At this time, the control unit 105 embeds the wireless station identifier to be transmitted by the representative wireless terminal 201 at a bit of the signal contents of the wireless frame format shown in FIG. 3, and writes data indicating that the wireless frame is transmission request, in the signal type of the wireless frame (step S22).

Here, if the representative wireless terminal is only one, the representative wireless terminal 201 demodulates the received wireless frame to send it to the control unit 2013. The control unit 2013 determines the signal type of the wireless frame of FIG. 3 (step S23). When the wireless frame indicates the transferring request, a head symbol of the signal contents is demodulated. The identification number of the destination wireless terminal to be transferred is acquired to access the storage 2014. The wireless terminal of transmission destination is acknowledged based on the management table of FIG. 9 (step S24).

Here, when the transferring destination of the wireless frame is the multicast address, the representative wireless terminal 201 transmits the wireless frame to the wireless terminal group 20 via the wireless transmission unit 2011 in the multicast format or the unicast format.

The wireless terminal 202 belonging to the wireless terminal group 20 demodulates the wireless frames via the wireless receiving unit 2022 (step S25). The wireless frame is unnecessary to be transferred for every one frame. The wireless frame may be stored in the storage 2014 of the representative wireless terminal 201, for example, redundancy of the several wireless frames is removed, configurations of the wireless frame are changed, and then the wireless frame may be transferred.

On the other hand, it is assumed that transmission destination of the wireless frames held by the wireless base station 10 is the unicast address for the wireless base station 202. Normally, the wireless base station 10 directly transmits the wireless frames to the wireless terminal 202 by using the conventional unicast format without passing through the representative wireless terminal 201.

Here, it is assumed that propagation environment between the wireless base station 10 and the wireless terminal 202 deteriorates. More specifically, the wireless base station 10 refers FIG. 6 and FIG. 8. It is assumed that the received status from the representative wireless terminal 201 to the wireless terminal 202 is better than the received status from the wireless base station 10 to the wireless terminal 202. In this case, even if the unicast address is described in the wireless frame, the wireless frame is transmitted via the representative wireless terminal 201.

When the same frequency is used in the wireless communication system, it is possible to receive all the wireless frames in principal. Because of this, it is possible to interpolate the wireless frames, for example, the other wireless terminals receive the wireless frames addressed to the representative wireless terminal 201 from the wireless base station 10, and then the wireless frames are transmitted to the representative wireless terminal 201.

Thus, even if the multicast address or the broadcast address is described in the wireless frames held by the wireless base station 10, the wireless frames are transmitted only to the representative wireless terminal 201 having excellent received status, and the transmission method can be determined at the received status of only the representative wireless terminal 201. Because of this, it is possible to reduce transmission power of the wireless base station 10, and increase transmission capacity thereof.

Even if an error occurs when the representative wireless terminal 201 receives the wireless frames, retransmission request of the wireless frames for the error may perform only to the representative wireless terminal belonging to the wireless terminal group 20. Conventionally, if automatic repeated request (ARQ) is used as error control technique, the retransmission request from all the wireless terminals has to be responded. Because of this, it was difficult to apply the ARQ.

However, according to the present embodiment, the repeated request from only the representative wireless terminal 201 may be responded. Because of this, as compared with the conventional system, it is possible to improve processing efficiency of the wireless base station 10 and the frequency availability of the entire wireless communication system.

Furthermore, even in a communication path in the representative wireless terminal 201 and the wireless terminal group 20, the wireless terminal group 20 is formed of the wireless terminal shaving excellent received status. Because of this, even if the ARQ is used, as compared with the conventional system, it is possible to improve processing efficiency of the wireless terminals, and the frequency availability of the entire wireless communication system.

On the other hand, even if the unicast address is described in the wireless frame held by the wireless base station 10, a table for managing the received status of the wireless terminals is referred, and it is possible to transmit the wireless frames via the wireless path having the most excellent received status. Because of this, it is possible to improve the frequency availability of the entire wireless communication system and to reduce transmission power.

Thus, according to the first embodiment, the representative wireless terminal receives the transmission frames from the wireless base station, and transmits the received transmission frame to the wireless terminals belonging to the wireless terminal group. Because of this, it is possible to reduce transmission power of the wireless base station, and to easily transmit a large amount of data such as image and data. That is, it is possible to increase transmission capacity.

Furthermore, because it is possible to dynamically change the representative wireless terminal, it is possible to perform stable and reliable communication, by assigning the wireless terminal having excellent received status as the representative wireless terminal.

Moreover, according to the present embodiment, it is possible to use the ARQ effective for the error control technique, an inherent modulation scheme and a communication system, thereby improving received quality.

Even when the representative wireless terminal transfers the wireless frames to the wireless terminal group, the representative wireless terminal transmits the wireless frames to the neighboring wireless terminals, thereby reducing the transmission power and the received quality.

On the other hand, even in the wireless frames transmitted from the wireless base station to the wireless terminals in the unicast form, a table for managing the received status of the wireless terminals is referred, and it is possible to transmit the wireless frames to the wireless terminal via the wireless path having the most excellent received status, thereby improving the frequency availability of the entire wireless communication system and reducing transmission power.

It is possible to improve transmission capacity and transmission quality, by using the individual modulation scheme and the communication system in the wireless terminal group.

Furthermore, it is possible to realize a parallel transmission technique and an adaptive array antenna technique which cannot be realized by a single wireless station, by operating the wireless terminal group as one wireless station under management of the representative wireless terminal.

As a conventional technique similar to the present embodiment, there is a technique disclosed in Japanese Patent Laid-Open No. 2001-189954. This is the technique in which the wireless base stations are divided into some groups according to movement of the wireless terminals and fluctuation of the propagation path, and the wireless base stations are adaptively constituted in order to improve diversity gain and to reduce power. However, the technique does not disclose the wireless terminal groups and a protocol used in the wireless terminal groups.

(Second Embodiment)

A second embodiment is different from the first embodiment in a method of forming the wireless terminal group 20, a method of determining the received status of the wireless terminals when the representative wireless terminal 201 is determined, and a method of determining the representative wireless terminal 201.

In the first embodiment, the wireless terminals constituting the wireless terminal group 20 perform the processing procedure of FIG. 10 between the other wireless terminals of the same wireless terminal group 20. On the other hand, according to the second embodiment, when the number of the wireless terminals constituting the wireless terminal group 20 is no less than three, the wireless terminal of new entry performs the processing procedure of FIG. 10 for one wireless terminal in the wireless terminal group 20. Therefore, it is possible to enter in the wireless terminal group 20.

That is, by using the method of forming the wireless terminal group of the second embodiment, the wireless terminals for transmitting the wireless frames from the wireless base station 10 can transfer the wireless frames to a lot of wireless terminals, besides the representative wireless terminal 201.

In the second embodiment, different from the first embodiment, the received status of the wireless terminals is determined based on received signal strength indication (RSSI) of the wireless frames, a ratio of received signal power to noise power, a ratio of received signal to interference power, a bit error rate, a symbol error rate and a frame error rate. The management table shown in FIG. 4 is created based on determination result of the received status, and the terminal having the most excellent received status is determined as the representative wireless terminal 201.

The wireless terminal belonging to the wireless terminal group having maximum number of the wireless terminals, which satisfies a desirable received status, may be decided as the representative wireless terminal 201. If the wireless terminal capable of maintaining the received quality between the maximum number of the wireless terminals is selected as the representative wireless terminal 201, even if the method of forming the wireless terminal group 20 shown in the second embodiment is adopted, it is possible to restrain traffic increase in the wireless terminal group 20, and improve processing efficiency of the wireless terminals of the wireless terminal group 20.

The received status of the transmission frame from the wireless base station 10 may be sent back to the wireless base station 10, and the representative wireless terminal 201 may be decided by the base station based on the feedback wireless frame.

For example, as described in the method of forming the above-mentioned wireless terminal group 20, after the wireless terminal group 20 is formed, the wireless terminals belonging to the wireless terminal group 20 measures the received status of the wireless frames from the wireless base station 10. The wireless terminals notify the wireless base station 10 of the measured received status by the wireless frame. The wireless base station 10 receiving the wireless frame demodulates the wireless frames and creates the management table shown in FIG. 6. The wireless base station 10 determines the wireless terminals having the most excellent received status as the representative wireless terminal 201 with reference to the management table of FIG. 6.

Among the wireless terminals belonging to the wireless terminal group 20, the wireless terminal having high performance may be selected as the representative wireless terminal 201. Here, the terminal having high performance indicates the receiver having a plurality of modulation schemes, communication systems and control systems. For example, the receiver having a lot of antennas, a large amount of antenna gain, an adaptive array antenna, high gain amplifier, low noise amplifier, a battery of long time driving capability, always-power-on, or connection for wired network is intended.

When the wireless terminal group 20 is formed, the wireless terminals notify the wireless base station 10 of the above-mentioned its own capability by using the wireless frame. The wireless base station 10 creates the management table shown, for example, in FIG. 14 based on performance of the wireless terminals belonging to the wireless terminal group 20. The record relating to the capability of the wireless terminal is not limited to one.

The wireless base station 10 determines the wireless terminal having the most excellent capability as the representative wireless terminal 201. After the representative wireless terminal 201 is determined, the wireless base station 10 notifies the representative wireless terminal 201 of the capability of the wireless station of the wireless terminal group 20 shown in FIG. 14, and the representative wireless terminal 201 also stores the management table shown in FIG. 14.

Thus, according to the second embodiment, since procedures entering in the wireless terminal group is simplified, it is possible to transmit the transmission frame from the wireless base station received by the representative wireless terminals to a lot of wireless terminals. Furthermore, the wireless base station creates the management table based on the wireless frames transmitted from the wireless terminals belonging to the wireless terminal group to the wireless base station, and the wireless terminal having the most excellent received status or the wireless terminal having highest performance is selected as the representative wireless terminal, thereby performing stable and reliable communication.

(Another Embodiment)

As a modified example of the first embodiment, when the wireless frame is transmitted from the wireless base station 10 to the representative wireless terminal, a modulation scheme different from the multicast format or the broadcast format may be used. As the modulation schemes, there are a plurality of modulation schemes, for example, shown in FIG. 15. The received status needed by each modulation scheme is different from each other, and transmission capacity is also different.

First of all, the wireless base station 10 confirms the modulation scheme held by the representative wireless terminal 201 with reference to FIG. 14. Next, with reference to FIG. 6 and FIG. 15, the received status of the representative wireless terminal 201 is detected with reference to FIG. 6 and FIG. 15. The wireless base station 10 determines the modulation scheme which can obtain the maximum transmission capacity and satisfy a desirable communication quality. However, when the received status of the wireless frame which is transmitted from the wireless base station 10 and is received by the representative wireless terminal 201 does not satisfy a desirable quality, for example, the bit error rate of $10^{-3}$ at 64 QAM system, the modulation scheme held by the representative wireless terminal 201 which satisfies a desirable quality is used instead of 64 QAM system.

With regards to the frames changing the modulation scheme, among the format of the wireless frame of FIG. 3, only a portion of the signal contents is changed. The modulation scheme held by all the wireless terminals is used for previous blocks. Or even if the received status is not good, the modulation scheme which satisfies a desirable quality is used, and it is possible to use a method of writing the identifier of the modulation scheme used for the blocks of the signal type in the block of the signal type. Or it is possible to use a method of notifying the modulation scheme modulated by the wireless base station 10 in another wireless frame.

As a modified example of the first embodiment, when the wireless frame is transmitted only to the representative wireless terminal 201, transmission may be performed with transmission power different from that of the multicast format or the broadcast format. In this case, as compared with the case of transmitting the wireless frame to all the wireless terminals as the conventional system, transmission is performed only to the limited wireless terminals. Therefore, it is possible to control transmission power in accordance with the received status of the destination address. After the representative wireless terminal 201 is determined, the wireless base station 10 confirms the received status of the representative wireless terminal 201 with reference to FIG. 5 and FIG. 6. For example, when the received status is good, the transmission power is reduced, and when the received status deteriorates, transmission power can be increased.

Furthermore, as a modified example of the first embodiment, when the wireless frame is transmitted only to the representative wireless terminal 201, the error control system different from the multicast format or the broadcast format may be used. The error control techniques include individual transmission capacity, error correction capacity and error detection capacity. As determination and execution of the error control system, the procedures described above in the case of changing the modulation scheme is applicable. It is possible to use the ARQ by actively using the error detection system in order to communicate with only the representative wireless terminal 201.

As a modified example of the first embodiment, when the wireless base station 10 transmits the wireless frames to the representative wireless terminal, a communication system different from the multicast format or the broadcast format is used. The communication system is determined with reference to FIG. 6 and FIG. 15. When high-speed transmission is performed, interference between codes due to multi-path becomes a problem. However, for example, by using a orthogonal frequency division multiplier (OFDM) system, it is possible to hold resistance to the interference between symbols, and to reduce error rate while performing high-speed transmission. As determination and execution of the communication system, the procedure described at the changing of the modulation schemes is applicable.

As a modified example of a first embodiment, when the wireless frame is transmitted to the representative wireless terminal 201, gain may be given only in a direction of the representative wireless terminal 201 by using directivity of the antennas as shown in FIG. 16. It is possible to reduce transmission power by decreasing transmission power. It is possible to transmit the wireless frame in a direction of the representative wireless terminal by using an adaptive array antenna generating the directivity by controlling amplitude or phase of a plurality of antenna elements.

Furthermore, as a modified example of a first embodiment, even when the representative wireless terminal 201 transmits the wireless frames to the wireless terminals belonging to the wireless terminal group 20, similarly to the above-mentioned explanation, the transmission power, the modulation scheme, the error control system and the communication system may be variable. With regard to the error control system, the error correction code and the error detection code may be decided based on a reference table of FIG. 17.

As determination and execution of the communication system, the procedure described at the above-mentioned determination of modulation schemes is applicable. When the wireless frames are transmitted from the representative wireless terminal 201 to the wireless terminal of the wireless terminal group 20, if control data included in the wireless frame is data that the wireless terminal does not need, the data is discarded. The control data necessary in the wireless terminal group 20 may be newly embedded.

Furthermore, as a modified example of the first embodiment, when the representative wireless terminal 201 transmits the wireless frames to the wireless terminal belonging to the wireless terminal group 20, the representative wireless terminal 201 does not transmit the wireless frames to the wireless terminals when the received status of the wireless terminal is no more than a threshold value due to short-period fluctuation of the wireless transmission path, or when a large amount of transmission power no less than the threshold value is necessary for improvement at the transmission time, with reference to FIG. 9, the transmission for the wireless terminal is not performed. And then the wireless frame is transmitted after the received status becomes no less than the threshold value. That is, only when the received status is good, the wireless frame is transmitted to select the transmission time. Therefore, it is possible to expect time diversity efficiency.

As a modified example of the first embodiment, when the representative wireless terminal 201 transmits the wireless frames to the wireless terminals belonging to the wireless terminal group, the representative wireless terminal 201 confirms that the wireless terminal is in a status capable of receiving the wireless frames of the representative wireless terminal 201, and transmits the wireless frames. More specifically, after the wireless terminal 20 is formed, the wireless terminal 202 writes the identifier indicating its own operational status in the signal contents of the wireless frame shown in FIG. 3. Furthermore, the representative wireless terminal writes in the signal type of the wireless frame what the identifier indicating operational status of the wireless terminal in the wireless frame is included.

The representative wireless terminal 201 creates a management table for managing operating status of the wireless terminal shown in FIG. 18. The representative wireless terminal 201 does not transmit the wireless frame when the wireless terminal 202 communicates with the other wireless terminal group 20, and cannot communicate with the representative wireless terminal with reference to FIG. 18. Or the representative wireless terminal 201 transmits in advance the wireless frame including control information which indicates cancellation of power saving status when the wireless terminal 202 is in power saving status, and the wireless frame is in the state in which it is difficult to receive the wireless frame. After the wireless terminal 202 becomes the status capable of receiving the wireless frames, the wireless frame is transmitted.

By such a control, transmission of useless wireless frame is avoided, and it is possible to improve frequency availability.

Furthermore, as a modified example of the first embodiment, even in an upload line from the wireless terminals to the wireless base station 10, the same method as communication method of the download line for the wireless terminals in the wireless terminal group 20 may be used. It is possible to apply an optimum communication system, modulation scheme and error control system in each of the paths. The representative wireless terminal 201 does not transmit the wireless frame collected from the wireless terminal group 20 to the wireless base station 10, but can transmit the wireless frames after collecting several frames. When levels of importance are different from the wireless frames, it is possible to transmit, for example, the control frame by priority to the wireless base station 10. When there is redundancy between the wireless frames, it is possible to restructure and transmit the wireless frames after abolishing the redundancy.

Furthermore, as a modified example of the first embodiment, when a license is necessary for data that the wireless base station 10 transmits, the representative wireless terminal 201 manages a license identifier of the wireless terminal, and may transmit the wireless frames to the wireless base station 10. The wireless base station 10 identifies the license identifier, divides the transmission data, adds the sequence identifier to each of the divided transmission data, and transmits the divided transmission data as the wireless frame to the wireless terminal having the most excellent received status at transmission time, with reference to FIG. 6.

The wireless terminal which has received the wireless frame from the wireless base station 10 transmits the receiving frame to the representative wireless terminal 201. The representative wireless terminal 201 restores the divided data based on sequence added to the wireless frames, and transmits the data to the wireless terminal holding the license.

Furthermore, as a modified example of the first embodiment, the representative wireless terminal performs remote control of the wireless terminals by transmitting the control frame to the wireless terminals of the wireless terminal group 20, and operates to achieve a function of one wireless station at the entire wireless terminal group 20. As one example, amplitude and phase of the antenna of the wireless terminals in the wireless terminal group 20 can be controlled by using the control frame, and the antennas of the entire wireless terminal group 20 can form directivity.

This corresponds to a method of constituting individual antenna elements of the adaptive array antenna by using a plurality of wireless terminals. By using such a method, it is possible to spatially separate and receive different information, thereby increasing frequency availability.

It is possible to receive the different information spatially and separately transmitted at the same frequency and the same time by a plurality of wireless terminal group 20. The adaptive array antenna adaptively changes amplitude and phase of the antenna, i.e. the antenna of the wireless terminals, in accordance with propagation paths. At this time, the representative wireless terminal 201 calculates the amplitude and the phase. In the present embodiment, although only the received property forming the adaptive array antenna has been described, the present embodiment is applicable even to transmission.

Furthermore, as a modified example of the first embodiment, as shown in FIG. 19, a hierarchical wireless terminal group 20 may be created, in which the wireless terminal 205 functions as the wireless terminal for the wireless terminal group 20, and functions as the representative wireless terminal 201 for the wireless terminal group 25. Furthermore, it is possible to simultaneously belong to two wireless terminal groups 20 and 40, as shown in the wireless terminal 202. A plurality of wireless base stations 10 may transmit the wireless frames to the representative wireless terminal 201, and a plurality of wireless base stations 10 may receive and combine the wireless frames transmitted from the representative wireless base station 10. The method described in the first embodiment is applicable to the procedures in the case of forming the wireless terminal group 20.

What is claimed is:

1. A wireless communication system, comprising:
   one or more wireless base station; and
   a plurality of wireless terminals capable of communicating with said wireless base station by wireless, two or more of said wireless terminals capable of communicating with each other by wireless thereby forming a wireless terminal group;
   wherein at least one wireless terminal belonging to said wireless terminal group is determined as a representative terminal;
   said representative terminal receives first frames transmitted from other wireless terminals belonging to said wireless terminal group, and transmits the received first frames to said wireless base station; and
   said representative terminal receives second frames transmitted from said wireless base station, and transmits the received second frames to the other wireless terminals belonging to said wireless terminal group.

2. A wireless communication system, comprising:
   one or more wireless base station; and
   a plurality of wireless terminals capable of communicating with said wireless base station by wireless, two or more of said wireless terminals capable of communicating with each other by wireless thereby forming a wireless terminal group;
   wherein said wireless base station has a representative determination unit configured to determine at least one wireless terminal belonging to said wireless terminal group as a representative terminal;
   said representative terminal receives first frames transmitted from other wireless terminals belonging to said wireless terminal group, and transmits the received first frames to said wireless base station; and
   said representative terminal receives second frames transmitted from said wireless base station, and transmits the received second frames to the other wireless terminals belonging to said wireless terminal group.

3. The wireless communication system according to claim 2,
   wherein frames of a multicast format or a broadcast format transmitted by said wireless base station to the wireless terminals except for said representative terminal belonging to said wireless terminal group are different from said second frames transmitted by said wireless base station to said representative terminal in at least one of transmission powers, modulation schemes, communication systems and error systems.

4. The wireless communication system according to claim 2,
   wherein said wireless base station has a transmission antenna capable of controlling directivity along a direction of said representative terminal.

5. The wireless communication system according to claim 2,
   wherein said representative terminal has a management table configured to register operating status of said wireless terminals belonging to said wireless terminal group, and determine the wireless terminal for transmitting the received wireless frame transmitted from said wireless base station.

6. The wireless communication system according to claim 2,
   wherein said wireless terminal group has a plurality of sub terminal groups of a hierarchical structure, each having at least one wireless terminal, said sub terminal group of lower rank belonging to said sub terminal group of upper rank, and said representative terminal being set for each rank.

7. A wireless communication system, comprising:
   one or more wireless base station; and
   a plurality of wireless terminals capable of communicating with said wireless base station by wireless, two or more of said wireless terminals capable of communicating with each other by wireless thereby forming a wireless terminal group;
   wherein said wireless base station has a representative determination unit configured to determine at least one wireless terminal belonging to said wireless terminal group as a representative terminal;
   said representative terminal receives first frames transmitted from other wireless terminals belonging to said wireless terminal group, and transmits the received first frames to said wireless base station; and
   said representative determination unit determines said representative terminal according to received status of the first frames transmitted from said wireless terminals belonging to said wireless terminal group.

8. The wireless communication system according to claim 7,
wherein each of said wireless terminals has:
a status measurement unit configured to measure received signal strength of second frames transmitted from said wireless base station; and
a status transmission unit configured to transmit the measured received signal strength to said wireless base station,
wherein said representative determination unit determines said representative terminal based on the received signal strength transmitted by said wireless terminals belonging to said wireless terminal group.

9. The wireless communication system according to claim 8,
wherein said representative determination unit determines as said representative terminal the wireless terminal having the maximum received signal strength of the first frames which is transmitted from said wireless terminals belonging to said wireless terminal group and received by said wireless base station.

10. A wireless communication system, comprising:
one or more wireless base station; and
a plurality of wireless terminals capable of communicating with said wireless base station by wireless, two or more of said wireless terminals capable of communicating with each other by wireless thereby forming a wireless terminal group;
wherein said wireless base station has a representative determination unit configured to determine at least one wireless terminal belonging to said wireless terminal group as a representative terminal;
said representative terminal receives first frames transmitted from other wireless terminals belonging to said wireless terminal group, and transmits the received first frames to said wireless base station; and
said representative determination unit determines as said representative terminal the wireless terminal having the most excellent hardware performance among said wireless terminals belonging to said wireless terminal group, the wireless terminal having the most excellent hardware performance being the wireless terminal having the most excellent received status, the wireless terminal belonging to the wireless terminal group having maximum number of the wireless terminals which satisfies a desirable received status, the wireless terminal capable of maintaining the received quality between the maximum number of the wireless terminals, the wireless terminal having a lot of antennas or the wireless terminal determined based on a wireless frame sent back to the wireless base station in response to a wireless frame sent from the wireless base station.

11. A wireless communication system, comprising:
one or more wireless base station; and
a plurality of wireless terminals capable of communicating with said wireless base station by wireless, two or more of said wireless terminals capable of communicating with each other by wireless thereby forming a wireless terminal group;
wherein said wireless base station has a representative determination unit configured to determine at least one wireless terminal belonging to said wireless terminal group as a representative terminal;
said representative terminal receives first frames transmitted from other wireless terminals belonging to said wireless terminal group, and transmits the received first frames to said wireless base station; and frames of a multicast format or a broadcast format transmitted by said wireless base station to the wireless terminals except for said representative terminal belonging to said wireless terminal group are different from said first frames transmitted by said wireless base station to said representative terminal in at least one of transmission powers, modulation schemes, communication systems and error systems.

12. A wireless base station capable of performing wireless communication between a plurality of wireless terminals forming the wireless terminal group, comprising:
a representative determination unit configured to determine at least one wireless terminal belonging to said wireless terminal group as a representative determination unit;
a receiving unit configured to receive the wireless frames transmitted from the wireless terminals except for said representative terminal belonging to said wireless terminal group, via said representative terminal; and
a transmission unit configured to transmit wireless frames to the wireless terminals except for said representative terminal belonging to said wireless terminal group,
wherein said representative terminal transmits the received wireless frames transmitted from said transmission unit to the other wireless terminals belonging to said wireless terminal group.

13. A wireless terminal configured to form a wireless terminal group between the other wireless terminals, and communicates with a wireless base station by wireless, comprising:
a transmission and reception unit configured to transmit the received wireless frames transmitted from said wireless base station to other wireless terminals belonging to said wireless terminal group, receives the wireless frames transmitted from the other wireless terminals belonging to said wireless terminal group, and transmits the received wireless frames to said wireless base station; and
a second management table configured to register operation status of said wireless terminals belonging to said wireless terminal group,
wherein said transmission control unit determines the wireless terminal configured to transmit the received wireless frame based on operation status of said wireless terminals registered to said second management table.

14. A method of wireless communication configured to form a wireless terminal group by two or more of said wireless terminals capable of communicating with each other by wireless, comprising:
determining at least one of said wireless terminals belonging to said wireless terminal group as a representative terminal, the determined representative terminal receiving wireless frames transmitted from said wireless terminals belonging to said wireless terminal group, and transmitting the received wireless frame to said wireless base station,
wherein said representative terminal receives second frames transmitted from said wireless base station, and transmits the received second frames to the other wireless terminals belonging to said wireless terminal group.

15. The method of wireless communication according to claim 14,
   wherein said representative terminal receives the wireless frames transmitted from said wireless base station and transmits the received wireless frames to the other wireless terminals belonging to said wireless terminal group.

16. The method of wireless communication according to claim 14,
   wherein said representative terminal is determined according to received status of the wireless frame transmitted from said wireless terminals belonging to said wireless terminal group.

* * * * *